(12) United States Patent
Loibl et al.

(10) Patent No.: US 8,256,796 B2
(45) Date of Patent: Sep. 4, 2012

(54) PASSENGER RESTRAINT SYSTEM

(75) Inventors: Johann Loibl, Senden (DE); Michael Kraft, Ulm (DE); Benedikt Heudorfer, Nersingen (DE); Oliver Pursche, Ulm (DE)

(73) Assignee: Takata AG, Aschaffenburg (DE)

( * ) Notice: Subject to any disclaimer, the term of this patent is extended or adjusted under 35 U.S.C. 154(b) by 0 days.

(21) Appl. No.: 13/346,608

(22) Filed: Jan. 9, 2012

(65) Prior Publication Data

US 2012/0139211 A1 Jun. 7, 2012

Related U.S. Application Data

(60) Continuation of application No. 12/923,443, filed on Sep. 22, 2010, now Pat. No. 8,091,920, which is a division of application No. 12/155,556, filed on Jun. 5, 2008, now Pat. No. 7,819,423, which is a continuation of application No. PCT/EP2006/011704, filed on Dec. 6, 2006.

(30) Foreign Application Priority Data

Dec. 6, 2005 (DE) .......................... 10 2005 059 197

(51) Int. Cl.
*B60R 21/20* (2006.01)
*B60R 21/207* (2006.01)
(52) U.S. Cl. .................................. 280/730.2; 280/728.2
(58) Field of Classification Search ............... 280/730.2, 280/728.2
See application file for complete search history.

(56) References Cited

U.S. PATENT DOCUMENTS

| | | | | | |
|---|---|---|---|---|---|
| 5,112,079 | A | * | 5/1992 | Haland et al. | 280/730.2 |
| 5,503,428 | A | * | 4/1996 | Awotwi et al. | 280/730.2 |
| 5,533,750 | A | * | 7/1996 | Karlow et al. | 280/730.2 |
| 5,564,739 | A | * | 10/1996 | Davidson | 280/736 |
| 5,630,616 | A | * | 5/1997 | McPherson | 280/730.2 |
| 5,636,862 | A | * | 6/1997 | Cheung et al. | 280/730.2 |
| 5,651,582 | A | * | 7/1997 | Nakano | 297/216.13 |
| 5,667,241 | A | * | 9/1997 | Bunker et al. | 280/730.2 |
| 5,752,714 | A | * | 5/1998 | Pripps et al. | 280/730.2 |
| 5,779,263 | A | * | 7/1998 | Lane et al. | 280/730.2 |
| 5,785,350 | A | * | 7/1998 | Inoue et al. | 280/743.2 |
| 5,890,733 | A | * | 4/1999 | Dillon | 280/730.2 |
| 5,890,734 | A | * | 4/1999 | Saderholm | 280/730.2 |
| 5,988,674 | A | * | 11/1999 | Kimura et al. | 280/730.2 |
| 5,997,032 | A | * | 12/1999 | Miwa et al. | 280/730.2 |
| 6,045,182 | A | * | 4/2000 | Chevallier et al. | 297/216.13 |
| 6,126,192 | A | * | 10/2000 | Enders | 280/728.2 |
| 6,189,916 | B1 | * | 2/2001 | Bowers et al. | 280/728.3 |
| 6,341,797 | B1 | * | 1/2002 | Seo | 280/730.2 |
| 6,364,348 | B1 | * | 4/2002 | Jang et al. | 280/730.2 |
| 6,386,577 | B1 | * | 5/2002 | Kan et al. | 280/730.2 |

(Continued)

FOREIGN PATENT DOCUMENTS

DE 296 01 497 U1 * 7/1996

(Continued)

*Primary Examiner* — Ruth Ilan
(74) *Attorney, Agent, or Firm* — Foley & Lardner LLP (57) ABSTRACT

A vehicle occupant restraint system includes an inflatable airbag arranged in a vehicle seat. When the airbag is triggered it at least partially unfolds in the direction of travel on a side of the vehicle seat facing the vehicle interior. The vehicle seat includes a backrest frame extending in a substantially vertical direction in the vehicle seat and substantially aligned in the direction of travel. The airbag is connected to a front end of the backrest frame pointing in the direction of travel.

13 Claims, 5 Drawing Sheets

U.S. PATENT DOCUMENTS

| | | | |
|---|---|---|---|
| 6,588,838 B1 * | 7/2003 | Dick et al. | 297/216.13 |
| 7,232,150 B2 * | 6/2007 | Nagayama | 280/730.2 |
| 2001/0019202 A1 * | 9/2001 | Holdampf et al. | 280/730.2 |
| 2001/0042974 A1 * | 11/2001 | Sasaki et al. | 280/728.2 |
| 2003/0168836 A1 * | 9/2003 | Sato et al. | 280/730.2 |
| 2005/0236819 A1 * | 10/2005 | Riedel et al. | 280/730.2 |

FOREIGN PATENT DOCUMENTS

| | | | |
|---|---|---|---|
| DE | 196 35 495 A1 * | 3/1998 | |
| DE | 197 46 387 A1 * | 4/1998 | |
| DE | 101 06 238 A1 * | 9/2002 | |
| EP | 1 588 907 A1 * | 10/2005 | |
| GB | 229 3355 A * | 3/1998 | |
| GB | 2 322 338 A * | 8/1998 | |
| GB | 239 7047 A * | 7/2004 | |
| JP | 10-100828 A * | 4/1998 | |
| JP | 10-100847 A * | 4/1998 | |
| JP | 2004-4217184 A | 8/2004 | |
| JP | 2005-119510 A | 5/2005 | |
| JP | 2005-306377 | 11/2005 | |
| WO | WO 01/49535 A1 * | 7/2001 | |

* cited by examiner

PASSENGER RESTRAINT SYSTEM

CROSS-REFERENCE TO RELATED PATENT APPLICATIONS

This application is a Continuation of U.S. application Ser. No. 12/923,443, filed Sep. 22, 2010, which is a Divisional of U.S. application Ser. No. 12/155,556, filed Jun. 5, 2008, which is a Continuation of International Application PCT/EP2006/011704, filed Dec. 6, 2006, which was published in German as WO 2007/065650, all of which are incorporated herein by reference in their entirety.

BACKGROUND

The present disclosure relates generally to the field of vehicle occupant restraint systems including an inflatable airbag that may be arranged in a vehicle seat.

There is a general requirement in the automotive industry in the event of a side collision to provide vehicle occupant restraint systems that restrain the occupants in their seat at a side remote to the impact using an airbag. The use of such an airbag may reduce the occurrence of injuries to the occupants due to contact with the vehicle interior or other occupants. Statistics show that approximately 27 to 30 percent of fatalities or severely injured occupants in side collisions are seated opposite the point of impact.

In conventional occupant restraint systems, a combination of a three-point belt and a two-point belt may be used to, for example, create or a four-point or five-point restraint system. Belt systems of these types may be uncomfortable for the occupant and there is a risk that the occupant may not fasten the safety belt at all.

SUMMARY

One embodiment of the disclosure relates to a vehicle occupant restraint system including an inflatable airbag arranged in a vehicle seat. When triggered, the airbag at least partially unfolds in the direction of travel on a side of the vehicle seat facing the vehicle interior. The vehicle seat includes a backrest frame extending in a substantially vertical direction in the vehicle seat and substantially aligned in the direction of travel. The airbag is connected to a front end of the backrest frame pointing or facing in the direction of travel.

Another embodiment of the disclosure relates to a vehicle occupant restraint system including an inflatable airbag arranged in a vehicle seat. When triggered, the airbag at least partially unfolds in a direction of travel on a side of the vehicle seat facing a vehicle interior. The vehicle seat includes a backrest frame extending in a substantially vertical direction in the vehicle seat and substantially aligned in the direction of travel. The inflated airbag has a main chamber and at least one auxiliary chamber. The auxiliary chamber adjoins a side of the main chamber facing away from the direction of travel. The auxiliary chamber is flow-connected to the main chamber.

Another embodiment of the disclosure relates to a vehicle occupant restraint system including an inflatable airbag arranged in a vehicle seat. When triggered, the airbag at least partially unfolds in a direction of travel on a side of the vehicle seat facing a vehicle interior. The vehicle seat includes a backrest frame extending in a substantially vertical direction in the vehicle seat and substantially aligned in the direction of travel. The airbag includes at least one check strap that runs in the interior of the airbag and that connects a first layer of the airbag to a second layer of the airbag when in an inflated state.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

According to an exemplary embodiment, an airbag arrangement may include an airbag that is fastened in a vehicle seat and positioned on a side of the vehicle seat facing away from the vehicle door as disclosed in WO 01/49535 A1, which is herein incorporated by reference in its entirety. When triggered, the airbag unfolds in the direction of travel and may prevent the vehicle occupant from sliding laterally out of the vehicle seat. The airbag may be stabilized and positioned using a strap arranged on the outside of the airbag.

According to various exemplary embodiments, a vehicle occupant restraint system may include an inflatable airbag arranged in a vehicle seat to restrict lateral movement or oblique forward movement of a vehicle occupant. The vehicle occupant restraint system may prevent the occupant at a side opposite the impact from being ejected out of their seat and limit contact of the occupant with other occupants and/or with the vehicle interior. The vehicle occupant restraint system may be used with a conventional three-point belt system.

According to an exemplary embodiment, an airbag of the vehicle occupant restraint system may be connected to the backrest frame at a front end in the direction of travel. One backrest frame may extend at each side of a vehicle seat. The backrest frame may be aligned in the direction of travel and may include a front end that points in the direction of travel. Furthermore, a rear end may face away from the direction of travel. The airbag may be connected to the backrest frame and the connection to the airbag may be provided at the front end of the backrest frame.

The front end of the backrest frame includes an end that points in the direction of travel. The front end of the backrest frame also includes regions of the backrest frame that adjoin the end pointing in the direction of travel. The spacing between the connecting structure and the end of the backrest frame may not be greater than half of the spacing between the end of the backrest frame and the rear end of the backrest frame in the direction of travel. Therefore, the connecting structure may be arranged in a front half of the backrest frame. In a further exemplary embodiment, the spacing between the connecting structure and the end of the backrest frame may not be greater than one quarter of the spacing between the end of the backrest frame and the rear end of the backrest frame in the direction of travel.

According to an exemplary embodiment, the airbag may be connected to the backrest frame at the front end in the direction of travel. As a result, the airbag may be unfolded in the direction of travel and the airbag shape may extend beyond the backrest. Additionally, the airbag may be supported on and stabilized by the backrest frame. Therefore, lateral movement or oblique forward movement of an occupant in the event of a side impact may be prevented. Additionally, the airbag may be used with conventional three-point belt systems.

The airbag may be at least partially resistant to buckling and may restrict lateral movement or oblique forward movement of a vehicle occupant in the event of a side collision. The airbag may be generally air-tight, contain a generally high pressure, and absorb energy from an impact by the vehicle occupant.

According to an exemplary embodiment, the connection of the airbag to the backrest frame may take place along a connecting line extending vertically and corresponding to the shape of the backrest frame. The airbag may be connected to the backrest frame by a plurality of fastening points (for example screw connections). Therefore, the airbag have a vertical structure in the region of the backrest connection and the airbag may be supported on the backrest frame reliably and over a defined vertical length.

According to an exemplary embodiment, the connection of the airbag to the backrest frame may include an auxiliary fabric layer connected to the airbag and to the front end of the backrest frame. The connection of the auxiliary fabric layer to the airbag may take place by a stitched connection of the auxiliary fabric layer to one of the fabric layers of the airbag with the stitched connection taking place at least along the periphery of the auxiliary fabric layer. Additionally, the auxiliary fabric layer may be adhesively bonded to one of the fabric layers of the airbag either along an edge region of the airbag or over the entire area of the airbag.

The use of the auxiliary fabric layer for fastening the airbag to the front end of the backrest frame may allow for a simple direct connection of the airbag to the backrest frame. Due to the fabric layers being situated on top of each other, the airbag may form at a least a partial region in the vicinity of the attachment of the auxiliary fabric layer that is stable and resistant to buckling. The partial region may be supported on the backrest frame and can also stabilize and position other regions or partial chambers of the airbag.

According to an exemplary embodiment, the connection of the auxiliary fabric layer to the front end of the backrest frame may be facilitated by a holding part. For example, the auxiliary fabric layer may be guided around the holding part, which is connected to the front end of the backrest frame. The holding part may be screwed to the end of the backrest frame. The holding part may allow a simple connection of the airbag to the front end of the backrest frame over a defined vertical length. In another exemplary embodiment, the auxiliary fabric layer may form a loop.

The vehicle occupant restraint system may include an airbag module carrier for fastening a gas generator and airbag packaging to the folded airbag. The module carrier may be a curved sheet metal part. The airbag module carrier may be connected to the front end of the backrest frame. More particularly, the module carrier may be connected to the backrest frame with a holding part that fastens the auxiliary fabric layer to the backrest frame with a simple construction. In another exemplary embodiment, the module carrier may be inserted completely or partially into a loop or pocket formed by the auxiliary fabric layer.

According to an exemplary embodiment, the airbag may include one or more darts in order to form one or more non-inflatable partial regions of the airbag. The darts are designed such that the airbag forms at least one vertical and/or horizontal column that is resistant to buckling. The column or columns may be stabilized and positioned by the partial region of the airbag that adjoins the backrest frame. The partial region of the airbag may be supported on the backrest frame to stabilize and position the airbag.

According to an exemplary embodiment, the inflated airbag may include a main chamber and at least one auxiliary chamber. The auxiliary chamber may adjoin a side of the main chamber facing away from the direction of travel. Additionally, the auxiliary chamber may be connected in flow to the main chamber. At least one auxiliary chamber engages laterally around the seat (e.g., similar to a claw) to generate additional stability for the airbag. Accordingly, the auxiliary chamber may at least partially engage laterally around the vehicle seat at a side that faces away from the direction of travel. As a result of the lateral engagement around the seat, the airbag may be well stabilized with regard to the airbags position in relation to the backrest. As a result of the airbag stabilization, other regions or partial chambers of the airbag may be similarly stabilized and form columns resistant to buckling. More particularly, regions that interact with a vehicle occupant in the event of a side collision may be stabilized and form columns resistant to buckling.

According to an exemplary embodiment, the airbag may include at least one check strap that runs in the interior of the airbag. In the inflated state, the check strap may connect a first layer of the airbag and a second layer of the airbag to one another to brace the airbag with an internal structure. The at least one check strap may connect the two airbag layers to one another and, in the inflated state, form a brace that provides additional support for the airbag for a side collision that may involved an occupant.

The check strap may extend in the direction of travel in the inflated airbag. Therefore, the airbag with forces exerted on it by a vehicle occupant in the event of a side collision may be further supported.

It is noted that the connection of the airbag to the front end of the backrest frame, the at least one auxiliary chamber facing away from the direction of travel, the at least one check strap in the interior of the airbag, and the associated exemplary embodiments may each be combined with one another or be used individually.

Figure 1:
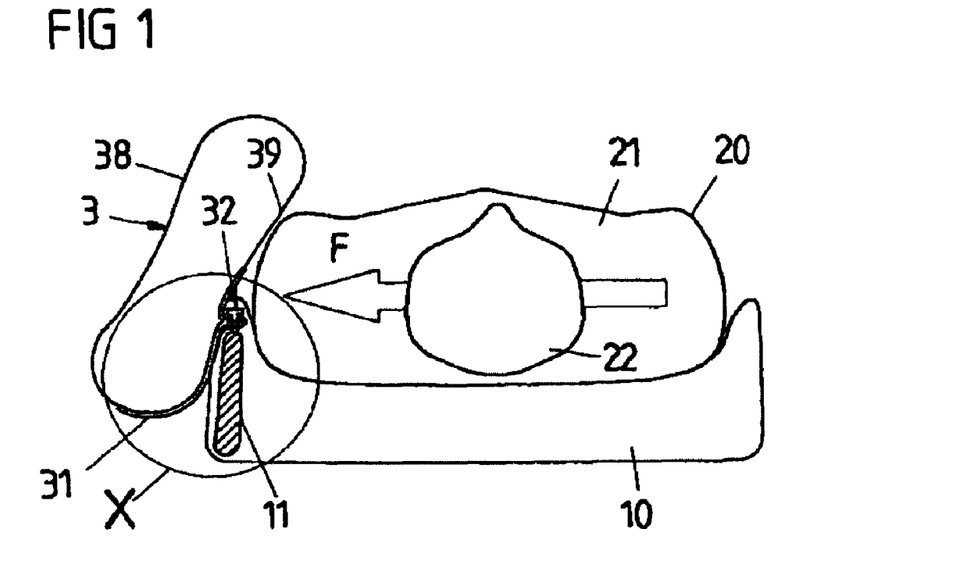
FIG. 1 is a schematic diagram showing a vehicle occupant restraint system, according to an exemplary embodiment.

FIG. 1 shows a vehicle occupant restraint system for the restraint of a vehicle occupant 20 on the side opposite the impact in the event of a side collision. The vehicle occupant restraint system includes an airbag 3 attached to the backrest frame 11 of a vehicle seat 10.

A vehicle seat 10 generally includes one backrest frame at each side of the backrest. Positioned on the other side of the vehicle seat 10 may be a corresponding backrest frame that generally includes no airbag or includes another airbag of either a similar or dissimilar design.

The two backrest frames of the vehicle seat may provides a frame structure such that additional components of the seat may be fastened directly or indirectly. The backrest frames extend in a vertical direction in the vehicle seat. The cross-sectional profile may be rectangular as shown in FIG. 1, with the small profile thickness. The backrest frame 11 is aligned in the direction of travel such that the backrest frame 11 includes a front end 12 in the direction of travel and a rear end 13 in the direction of travel (see FIG. 2).

The airbag 3 includes two fabric layers 38, 39 that are situated one on top of the other when laid out flat in the unfolded, non-inflated state. When the airbag is inflated, the two fabric layers 38, 39 are spaced apart from one another and form the airbag volume between them. An auxiliary fabric layer 31 is connected to the fabric layer 39 of the airbag 3 and fastens the airbag 3 to the front end of the backrest frame 11 in the direction of travel. The fastening is facilitated by a fastening structure 32 that is explained in detail with reference to FIG. 2 (the detail from the "X" portion of FIG. 1 on an enlarged scale).

Referring still to FIG. 1, a passenger seat or other seat may be arranged centrally or at a right-hand side in the rear of the vehicle. The vehicle occupant restraint system can also be used in a driver seat or in a seat that is arranged centrally or at the left-hand side in the rear of the vehicle (with the airbag then being arranged on the right-hand side of the seat). Therefore, the airbag may be positioned in a so-called mid-mounted side airbag.

In a side collision, the vehicle occupant 20 includes a torso 21 and head 22 that experience a force acting in the direction of the arrow F. The force may be sufficient to eject the vehicle occupant 20 out of the vehicle seat 10. To prevent ejection, the airbag 3 is fastened to the backrest frame 11. The airbag may restrict lateral movement or oblique forward movement of the vehicle occupant 20, preferably in interaction with a conventional three-point belt system. As a result, the vehicle occupant 21 on a side opposite the impact may be prevented from moving out of the region of their seat during the side collision. Furthermore, risk of injury as a result of contact with vehicle elements or other vehicle occupants may be reduced. For effective restraint of the vehicle occupant, the airbag 3 may be constructed to be as stable and resistant to buckling as possible.

Figure 2:
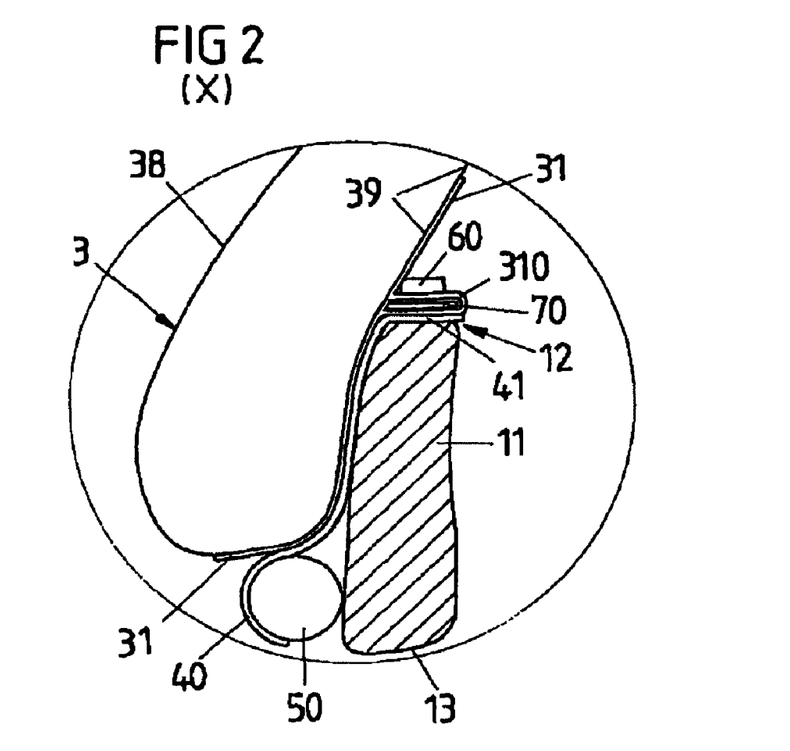
FIG. 2 illustrates greater detail of the "X" portion of FIG. 1, according to an exemplary embodiment.

Referring to FIG. 2, the airbag 3 may be connected directly to the end 12 of the backrest frame 12 by the auxiliary fabric layer 31. The airbag may be connected using a pocket 310 of the auxiliary fabric layer 31, a holding part 70, and screws 60. The auxiliary fabric layer 31 is guided around the flat holding part 70 in the region of the pocket 310. The flat holding part 70 extends along the end 12 of the backrest frame. The material pocket 310 and the holding part 70 are screwed to the end 12 of the backrest frame 11 by screws 60. The auxiliary fabric layer 31 and the airbag 3 are connected to the vertically-extending backrest frame 11 or the end 12 of the vertically-extending backrest frame 11 that points in the direction of travel over a defined length.

Referring still to FIG. 2, a module carrier 40 may be connected to the backrest frame 11 by the screw connection 60. The module carrier 40 may be constructed from sheet metal and form a flat region 41 that directly adjoins the end 12 of the backrest frame 11. The module carrier 40 may be screwed together with the two fabric layers of the material pocket 310 and the holding part 70.

The module carrier 40 holds and fastens a gas generator 50 at an end of the backrest frame 11 facing away from the end 12. The gas generator 50 and the folded airbag 3 form an airbag module with the module carrier 40 and additional conventional components of an airbag module. The additional components may include a module housing, airbag sensors, and a control device. The additional components are not illustrated separately in the FIGS. because they are well known to a person skilled in the art.

Figure 3:
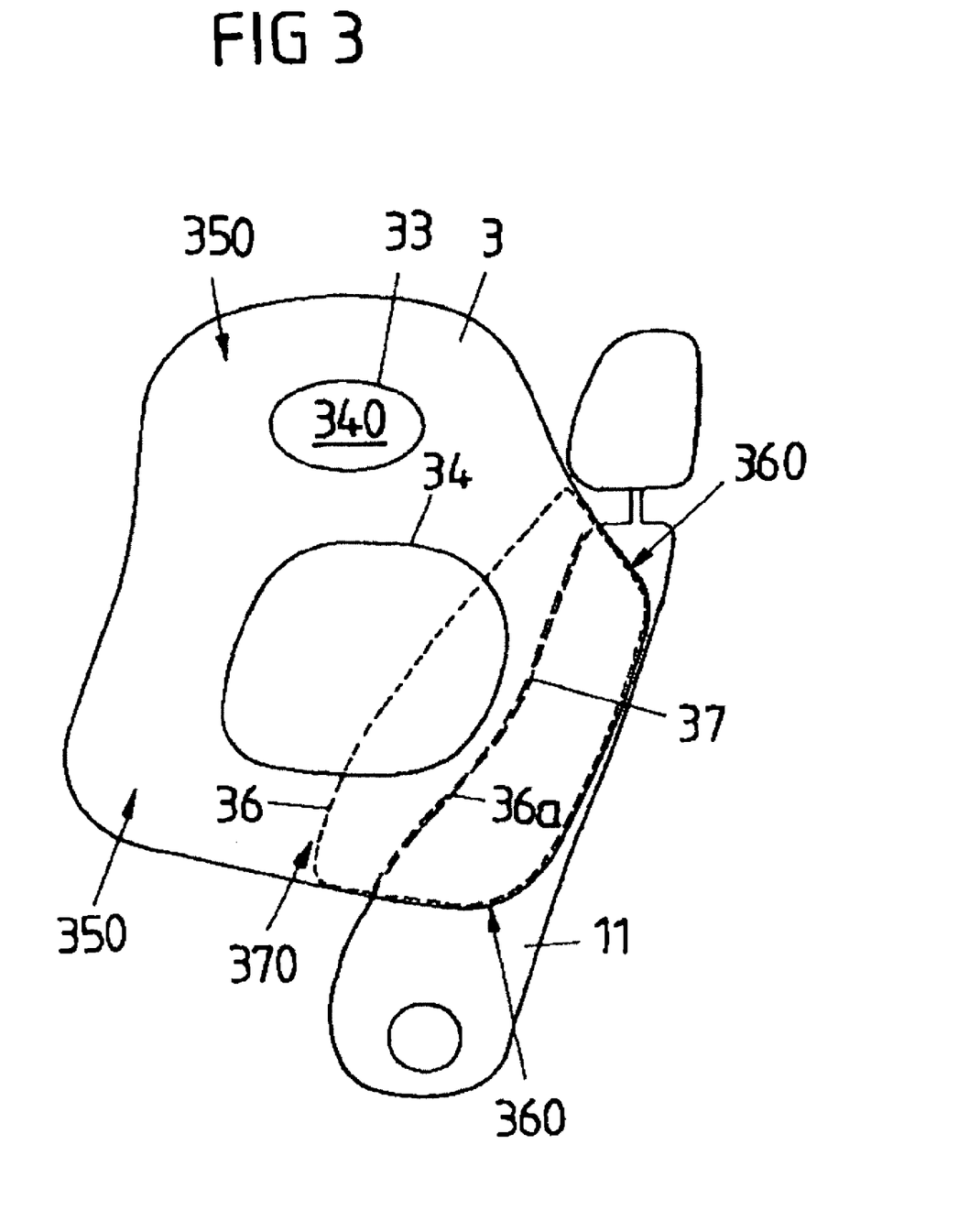
FIG. 3 is a side view of a vehicle occupant restraint system, according to an exemplary embodiment.

FIG. 3 shows the vehicle occupant restraint system from FIG. 1 in a side view. The dashed line 36 indicates a connecting line along which the auxiliary fabric layer 31 is connected to the one fabric layer 39 of the airbag 3. Additionally, the auxiliary fabric part 31 is connected along a dashed connecting line 37 as shown in FIG. 2. The auxiliary fabric part 31 is connected to the end 12 of the backrest frame.

The auxiliary material layer 31 is connected along its periphery to the corresponding material layer 39 of the airbag 3. It is also possible for a stitching to take place between the auxiliary material layer 31 and the airbag material layer 39 in the region of the connection of the auxiliary material layer 31 to the backrest frame 11. Therefore, the airbag 3 is guided close to the end 12 of the backrest frame 11 in the connecting region. Shown in FIG. 3, another stitching type is illustrated by line 36a, that overlaps the connecting line 37.

According to an exemplary embodiment, the auxiliary material layer 31 may be adhesively bonded to the corresponding material layer 39 of the airbag. The bond may occur along the periphery of the auxiliary material layer 31 or over a large area.

The airbag 3 may also include two darts 33, 34 that form a non-inflatable partial region 330, 340 of the airbag.

When the airbag 3 unfolds, it forms a highly stabilized partial region 360 in the region that is connected to the auxiliary material layer 31. Furthermore, the partial region 360 is supported directly on the backrest frame 11 to stabilize and position the airbag 3. As a result of connecting the airbag 3 to the front end of the backrest frame 11 in the direction of travel, the airbag 3 may extend a great distance in the direction of travel from the backrest 10 and a vehicle occupant may be restrained in the event of an oblique forward movement. The region 360 of the connection of the airbag 3 to the backrest frame 11 additionally forms a partial region. The partial region includes a stabilizing and positioning action on account of the auxiliary material layer 31 and the support directly on the backrest frame 11.

As a result of the stabilization and positioning, other partial regions of the airbag may be stabilized. More particularly, in the exemplary embodiment of FIG. 3, the airbag 3 may form a vertical column 350 that is resistant to buckling and is adjacent to and formed by the non-inflatable partial regions 330, 340 in the direction of travel. The airbag 3 may form a horizontal column 370 below the non-inflatable partial region 330. The columns 350, 370 are stabilized and reinforced against buckling or deflection as a result of the partial region 360.

Figure 6:
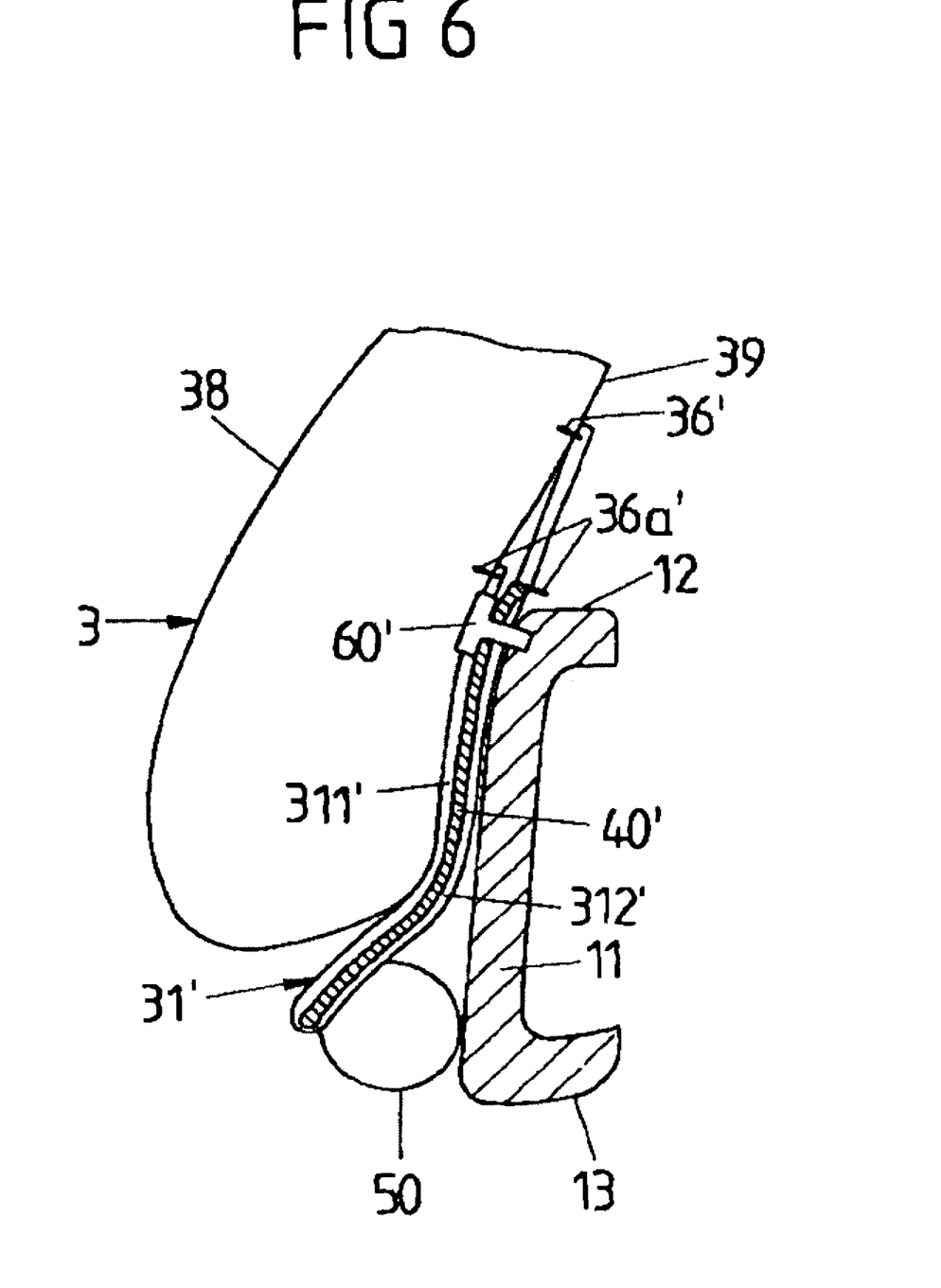
FIG. 6 is a sectional view of a vehicle occupant restraint system, according to a further exemplary embodiment.

Referring to FIG. 6, according to an exemplary embodiment, an airbag 3 includes two material layers 38, 39, a backrest frame 11, a module carrier 40', a gas generator 50, an auxiliary material layer 31', and a fastening 60' for connecting the auxiliary material layer 31' to the backrest frame 11. The auxiliary material layer 31' may be fastened adjacent to the end 12 in a region of the backrest frame 11 that extends in the direction of travel.

Referring to FIG. 6, the auxiliary material layer 31' may be a pocket formed by a layer 311' that faces toward the airbag 3 and by a layer 312' that faces away from the airbag 3. The module carrier 40' may be completely inserted into the pocket and is therefore surrounded by the two material layers 311', 312'.

The restraint system also includes two stitchings 36', 36a'. The stitchings 36', 36a' fasten the auxiliary material layer 31' to the airbag 3 or to its material layer 39. The stitching 36a' runs adjacent to and therefore overlaps the fastening 60'. The stitching 36a' also runs adjacent to and overlaps fastening line provided by the fastening 60'. The fastening line runs perpendicular to the plane of the drawing, between the airbag 3 and the backrest frame 11. As a result, the inflated airbag 3 is aligned in the vertical direction on the backrest frame 33. The stitching 36' connects an edge region of the auxiliary material layer 31' to the airbag. The stitching 36' can be encircling to create a connection between the auxiliary material layer 31 and the airbag 3 in a rear region in the direction of travel (adjacent to the module carrier 40'). In other embodiments, additional stitchings can be provided.

The fastening 60' may be screws or bolts and, in one exemplary embodiment, engage through the layer 312' that faces away from the airbag 3 and through the module carrier 40'. Corresponding screws or bolts can be pre-assembled on the module carrier 40'. In other embodiments, the fastening 60' may engage through both layers 311', 312' of the auxiliary material layer 31' and through the module carrier 40'.

Figure 4:
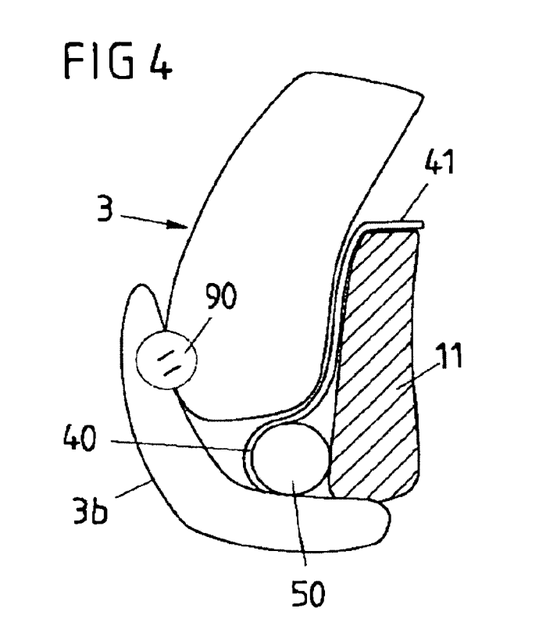
FIG. 4 is a sectional view of a vehicle occupant restraint system, according to an exemplary embodiment.

Referring to FIG. 4, an exemplary embodiment of a vehicle occupant restraint system is shown. The vehicle occupant restraint system includes an airbag 3 that is connected to a backrest frame 11 of a motor vehicle seat. Additionally, the type of connection of the airbag to the backrest frame 11 is not important. The connection can take place corresponding to the embodiments of FIGS. 1 to 3 or through an alternative method. For example, the airbag 3 may be directly or indirectly connected to the backrest frame at various other point or through an alternative method. Furthermore, a module carrier 40 and a gas generator 50 are included. The module carrier is connected in a flattened region 41 to the end of the backrest frame 11. The connection may take place at various points of the backrest frame 11 and in alternative method.

In the exemplary embodiment of FIG. 4, the airbag 3 is composed of two partial chambers; a main chamber 3a extending in the direction of travel and filled directly with the gas of the gas generator 50 in the event of triggering, and an auxiliary chamber 3b connected to the main chamber 3a. The auxiliary chamber 3b adjoins the main chamber 3a at a side facing away from the direction of travel. A flow connection 90 between the main chamber 3a and the auxiliary chamber 3b allows gas to flow from the main chamber 3a into the auxiliary chamber 3b when the airbag 3 is triggered.

The auxiliary chamber 3b at least partially engages around the vehicle seat at a side facing away from the direction of travel, for example a rear side and in the manner of a claw. The auxiliary chamber 3b and its engagement around the backrest provides the airbag 3 with additional stability such that the main chamber 3a has a greater degree of buckling resistance and positional accuracy in the event of an impact of a vehicle occupant.

The auxiliary chamber 3b is preferably of a generally sickle or boomerang shape in cross section to make engagement around the rear side of the vehicle seat as effective as possible.

The flow connection 90 between the two chambers 3a, 3n can be of any past, present, or future design. The illustration provided is to be understood merely as a schematic. For example, a snout may project from the main chamber 3a into the auxiliary chamber 3b, via which snout gas is conducted into the auxiliary chamber 3b when the internal pressure in the main chamber 3a rises above a certain level.

The internal pressure of the gas in the inflated airbag 3 is greater than about 1.5 bar. Alternatively, the internal pressure of the gas in the inflated airbag 3 is approximately 2 bar.

The airbag 3 may include a plurality of auxiliary chambers instead of the single auxiliary chamber 3b. All of the auxiliary chambers may be filled by the main chamber 3a or an auxiliary chamber may filled by another auxiliary chamber that is pre-filled by the main chamber 3a.

Figure 5:
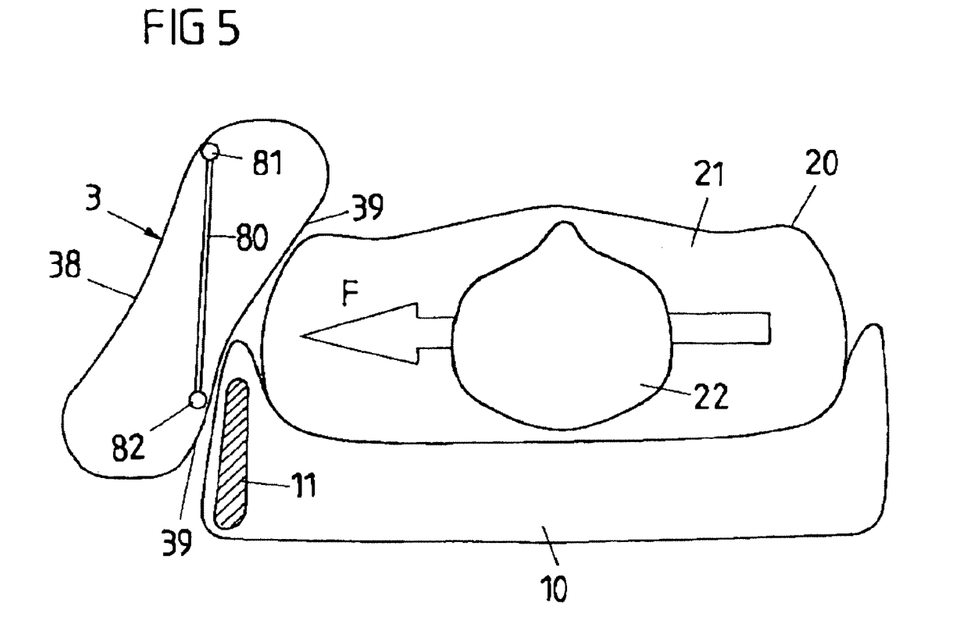
FIG. 5 is a sectional view of a vehicle occupant restraint system, according to another exemplary embodiment.

FIG. 5 shows a further exemplary embodiment. Vehicle seat 10 is illustrated in a cross-section and include the backrest frame 11 and supports a vehicle occupant 20 with a torso 21 and head 22. The construction of the vehicle seat is similar to the vehicle seat of FIG. 1. The airbag 3, like the airbag of FIG. 4, may be connected to the end of the backrest frame 11 corresponding to the embodiment of FIGS. 1 to 3, or can be connected to the backrest frame adjacent to the end of the latter corresponding to the embodiment of FIG. 6. The connection to the backrest frame 11 can also take place in some other way, for example a connection to other regions of the backrest frame 11.

To stabilize the airbag 3 and provide a high degree of buckling resistance with respect to an impacting occupant 20, the restraint system includes a check strap 80 in the interior of the airbag 3. The check strap 80 is connected by a connecting point 81 to the one material layer 38 and by a connecting point 82 to the other material layer 39. The check strap 80 preferably extends substantially in the direction of travel, corresponding to the illustration of FIG. 5. In the event of a force F acting on the airbag 3, the check strap 80 provides the airbag 3 with additional stability against buckling or deflection. In alternative exemplary embodiments, a plurality of check straps are provided that run parallel or cross each other.

The gas generator can be arranged in various ways according to the exemplary embodiments. In an embodiment illustrated in FIG. 7, the gas generator 50 is arranged between the airbag 3 and the backrest frame. A curved tube 51 is connected to the outlet opening of the gas generator 50 and projects into the airbag 3 or is connected to a filling opening of the airbag. The tube can also be a flexible hose or the like. The tube includes holes at an end arranged in the airbag. The holes discharge the gas in multiple directions when the airbag triggers and provides thrust neutrality. The forces transmitted to the airbag by the emerging gases are substantially cancelled out. The airbag is fastened to the tube, for example, by a clamp.

Figure 7:
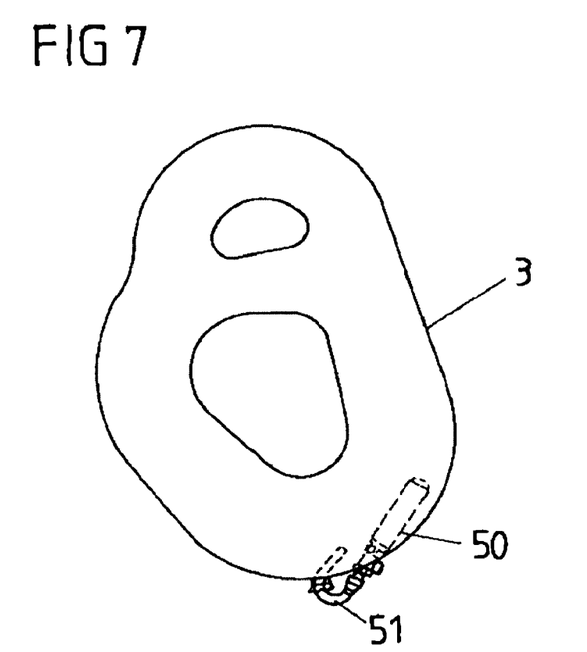
FIG. 7 shows an arrangement of a gas generator, according to an exemplary embodiment.
Figure 8:
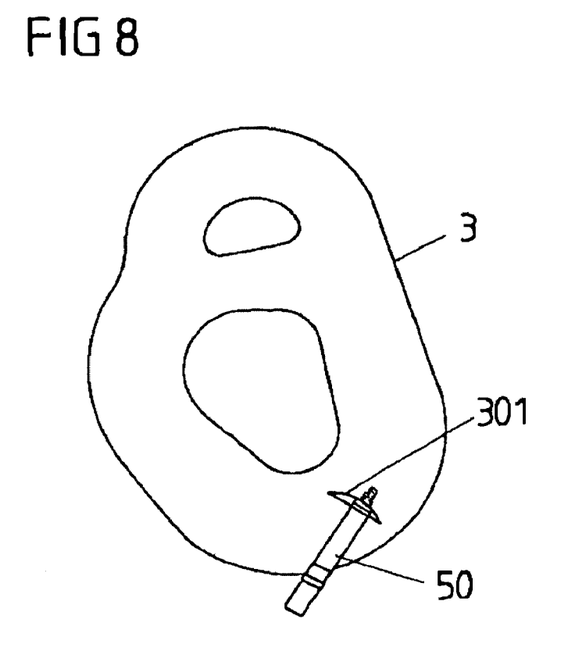
FIG. 8 shows an arrangement of a gas generator, according to another exemplary embodiment.

It is noted that in the illustration of FIG. 7 the gas generator 50 is situated behind the airbag 3 and the tube 51 is curved out of the plane of the drawing. In a further exemplary embodiment illustrated in FIG. 8, the gas generator 50 is arranged partially or completely within the airbag 3. The outlet opening of the gas generator 50 (not illustrated) is situated within the airbag 3. One end of the gas generator 50 is situated outside the airbag, but can alternatively be inside the airbag 3. The airbag has a slot 301 in one of its layers to insert the gas generator 50 or a portion of the gas generator 50 into the airbag 3. The airbag 3 is fastened directly to the gas generator 50, for example by a clamped connection.

The folded airbag material is, in one embodiment, situated in front of the filling element in the x direction (that is to say in the direction of travel) to ensure that the unfolding is directed primarily in the x direction. Otherwise, the airbag may unfold too far in the direction of the interior space (y direction).

The exemplary embodiments of FIGS. 1 to 3, of FIG. 4, and of FIG. 5 can be used in any combination. The exemplary embodiments of FIG. 6, of FIG. 4, and of FIG. 5 can also be used in any combination. For example, the airbag of FIG. 1 or of FIG. 6 can have a check strap 80 corresponding to FIG. 5 or form an auxiliary chamber 3b corresponding to FIG. 4. It is, for example, also possible for the embodiment of FIG. 4 to be combined with the embodiment of FIG. 5. The embodiments of FIG. 4 and FIG. 5 however do not necessarily require the connection of the airbag to the backrest frame to take place at the front of the backrest frame in the direction of travel. The connection of the airbag to the backrest frame may take place in some other way.

The priority application, German Patent Application No. 10 2005 059 197.3 filed Dec. 6, 2005, including the specification, drawings, claims and abstract, is incorporated herein by reference in its entirety.

Given the disclosure of the application, one versed in the art would appreciate that there may be other embodiments and modifications within the scope and spirit of the application. Accordingly, all modifications attainable by one versed in the art from the present disclosure within the scope and spirit of the present application are to be included as further embodiments of the present application. The scope of the present application is to be defined as set forth in the following claims.

What is claimed is:

1. A vehicle occupant restraint system configured to be connected to a vehicle seat, comprising:
    an inflatable airbag, wherein the airbag is configured to inflate and at least partially unfold in the direction of travel of the vehicle on a side of the vehicle seat that faces a middle of the vehicle;
    a carrier for supporting the airbag, wherein the carrier is configured to be connected to the vehicle seat;
    wherein a location of a portion of the airbag is fixed along a line extending in a substantially vertical direction and wherein the airbag in an unfolded state or an inflated state is supported by the vehicle seat over a defined vertical length such that an area of the unfolded or inflated airbag located behind the line is supported by the seat in an overlapping region in which the unfolded or inflated airbag and the seat overlap, thereby providing for a stabilizing and positioning of the airbag; and
    wherein the airbag is connected to the carrier by an auxiliary fabric layer connected to the airbag and to the carrier.

2. The system of claim 1, wherein the auxiliary material layer is a flap.

3. The system of claim 1, wherein the auxiliary material layer includes a loop or pocket surrounding the carrier.

4. The system of claim 1, wherein the carrier is connected to a backrest frame of the vehicle seat.

5. The system of claim 1, wherein the auxiliary fabric layer is connected to the airbag along at least a portion of the periphery of the auxiliary fabric layer.

6. The system of claim 5, wherein the connection between the auxiliary fabric layer and the airbag is located forward, in the direction of vehicle travel, of the line along which the portion of the airbag is fixed.

7. An airbag module for a vehicle including a seat, comprising:
    a gas generator;
    an airbag, wherein the airbag is configured to be inflated by gas provided by the gas generator, and wherein the airbag is configured to unfold in a direction of travel of the vehicle on a side of the seat that faces a middle of the vehicle,
    a module carrier connected to the seat;
    an auxiliary fabric layer connected to the airbag and to the module carrier, wherein the airbag is configured so that when the airbag inflates and unfolds the position of a portion of the airbag is fixed along a line extending in a substantially vertical direction and wherein another portion of the airbag located rearward of the fixing line overlaps and is supported by the side of the seat and the another portion of the airbag provides stabilization and positioning of the inflated airbag.

8. The airbag module of claim 7, wherein the module carrier is connected to a backrest frame of the seat.

9. The airbag module of claim 7, wherein the auxiliary fabric layer comprises a flap.

10. The airbag module of claim 7, wherein the auxiliary fabric layer comprises a loop or pocket surrounding the carrier.

11. The airbag module of claim 7, wherein the auxiliary fabric layer is connected to the airbag along at least a portion of the periphery of the auxiliary fabric layer.

12. The airbag module of claim 11, wherein the connection between the auxiliary fabric layer and the airbag is located forward, in the direction of vehicle travel, of the line along which the portion of the airbag is fixed.

13. The airbag module of claim 7, wherein the fixing line is located along a front end of the backrest frame.

* * * * *